United States Patent [19]

Dummermuth

[11] Patent Number: 5,582,256
[45] Date of Patent: Dec. 10, 1996

[54] WHEEL BLOCKING FOR AN IMPLEMENT FOR GROUND TREATMENT

[75] Inventor: Paul Dummermuth, Zunzgen, Switzerland

[73] Assignee: Pamag AG, Switzerland

[21] Appl. No.: 495,237

[22] Filed: Jun. 27, 1995

[30] Foreign Application Priority Data

Jun. 27, 1994 [CH] Switzerland ............. 02038/94

[51] Int. Cl.⁶ .................................. A01B 63/16
[52] U.S. Cl. .................. 172/395; 172/15; 188/19
[58] Field of Search ............ 172/395, 15; 56/17.1, 56/17.2; 280/33.994; 188/19; 29/81.05

[56] References Cited

U.S. PATENT DOCUMENTS

| D. 252,880 | 9/1979 | Dummermuth | D15/48 |
|---|---|---|---|
| D. 252,881 | 9/1979 | Dummermuth | D15/48 |
| 3,129,770 | 4/1964 | Ditter | 172/15 |
| 3,448,812 | 6/1969 | Peters | 172/15 |
| 3,743,028 | 7/1973 | McCloud | 172/15 |
| 4,523,361 | 6/1985 | Dummermuth | 29/81 J |
| 4,840,388 | 6/1989 | Doughty | 188/19 X |
| 5,090,517 | 2/1992 | Doughty | 280/33.994 X |
| 5,119,880 | 6/1992 | Zehrung, Jr. et al. | 56/17.2 X |
| 5,305,842 | 4/1994 | Dummermuth | 180/11 |
| 5,390,942 | 2/1995 | Schuster et al. | 280/33.994 |

FOREIGN PATENT DOCUMENTS

| 0548009 | 12/1992 | European Pat. Off. . |
|---|---|---|
| 666173 | 7/1988 | Switzerland . |

Primary Examiner—Terry Lee Melius
Assistant Examiner—Victor Batson
Attorney, Agent, or Firm—Speckman, Pauley & Fejer

[57] ABSTRACT

A manually displaceable implement for ground treatment comprising a housing (1), a rotor drum (2) rotatably maintained therein and driven by a motor, a connecting piece (3) and height-adjustable running wheels (5). In the non-operating state, the running wheels (5) are lowered, so that the rotor drum (2) is raised off the ground (B) to be treated. In the process, at least one running wheel (5) rests against a stop disposed on the housing (1) and is blocked in this manner. The implement for ground treatment is secured by this blocking means (10) and does not make any uncontrolled movements, even if the drive motor of the rotor drum (2) is switched on.

8 Claims, 1 Drawing Sheet

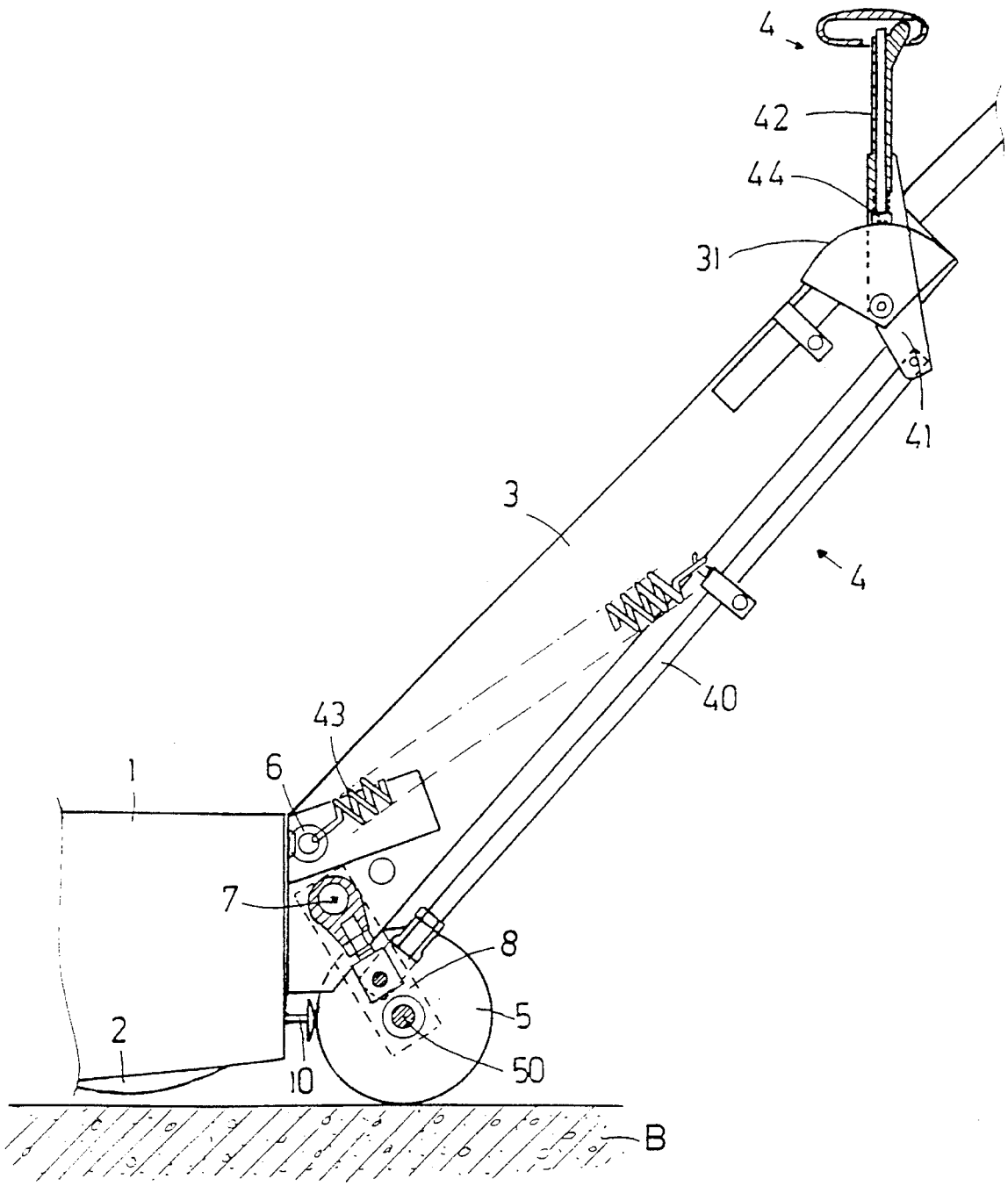
Figur 5,582,256

WHEEL BLOCKING FOR AN IMPLEMENT FOR GROUND TREATMENT

BACKGROUND OF THE INVENTION

1. Field of the Invention

This invention relates to a manually displaceable implement for ground treatment, having a housing, a motor-driven rotor drum rotatably seated in the housing, a connecting piece, and height-adjustable running wheels, wherein the rotor drum is almost completely lifted off the ground to be treated in a lower end position of the running wheels.

2. Description of Prior Art

Implements for ground treatment are employed for cleaning, roughening or cutting of concrete, asphalt or metal surfaces. In general, they have a cage-like, motor-driven rotor drum as a treatment tool, with cage shafts on which several freely rotating beater disks are disposed. The rotor drum is disposed in such a way that the rotating beater disks cut down the surface of the ground to be treated. The setting of the treatment depth is performed by displacing the relative rotor drum shaft in respect to the surface of the ground. Generally this setting is performed by means of height-adjustable running wheels. The forward motion is manually generated by the person operating the implement.

In the operational state, such implements for ground treatment have the tendency to run away because of the direction of rotation of the rotor drum. Thus, the person operating the implement can expect the device to perform uncontrolled movements as soon as the motor is started. For the same reason, an implement for ground treatment, once it has been started, can no longer be released.

Some models of known implements for ground treatment are turned off when not in use by lowering the height-adjustable wheels. The rotor drum is thus lifted and the implement rests on the ground only on its wheels. The rotor drum turns freely without treating the ground. In spite of this, there is still the danger in connection with such turned-off machines that the machine moves uncontrollably forward when the motor driving the rotor is started or when the machine is parked.

SUMMARY OF THE INVENTION

It is an object of this invention to provide an implement for ground treatment which can be made safe from uncontrolled movement.

This object is attained by a manually displaceable implement for ground treatment comprising a housing, a motor-driven rotor drum rotatably seated in the housing, a connecting piece, and height-adjustable running wheels. When the running wheels are in a lower end position, the rotor drum is almost completely raised off the ground. To prevent uncontrollable rolling, the implement further comprises blocking means for blocking at least one of the running wheels when said at least one running wheel is in a lower end position.

In accordance with one embodiment of this invention, at least one running wheel is blocked on one side when the height-adjustable wheels are lowered in this state. The rotor drum is sufficiently lifted in this state so that it no longer touches the ground. If the implement is now started up, the rotor drum turns freely and without being under a load, while the wheels continue to be blocked. In this way, the implement for ground treatment stands still and thus is safe.

In a preferred embodiment of this invention, the blocking means of the running wheel(s) comprises a stop against which the blockable running wheel is pressed in its lowered position by a spring. As a result, the wheel is automatically blocked in the position of rest of the implement. In accordance with one preferred embodiment, the stop is a part of the housing or is the housing itself. The operational safety of such machines is considerably increased by the blocking of the wheels in accordance with this invention. The blockage itself is simply designed and can also be retrofitted on existing implements for ground treatment.

Implements for ground treatment which have brake-like devices are known in the prior art. However, these are devices used to provide even advancement in the operating state. Depending on the type of ground, the operator must either brake or push the implement.

Swiss Patent No. 666,173 describes a device for displacing or braking a surface cleaning implement. This device consists of a frame with two wheels, a seat for the operator and a pedal drive. The device is connected to the implement, so that advancement is generated by means of the pedal drive and the implement can be moved evenly over the surface to be treated.

European Patent Application Nr. 0 548 009 also discloses an advancement device mounted on an implement for ground treatment. This advancement device has a friction wheel which presses on the running wheels of the implement and is driven by a separate motor. The rotational speed of the running wheels is determined in this way.

However, only even advancement is achieved by both disclosed implements for ground treatment. Stopping the implement for ground treatment safely in place while the rotor drum rotates is not possible with these designs. In particular, when the machine is switched on, there is no blockage. Therefore, the above mentioned disadvantages are not alleviated by these implements.

BRIEF DESCRIPTION OF THE DRAWINGS

These and other objects and features will be better understood from the following detailed description taken in conjunction with the single drawing FIGURE which shows an implement for ground treatment in accordance with one embodiment of this invention.

DETAILED DESCRIPTION OF THE PREFERRED EMBODIMENT

The implement for ground treatment shown in the drawing has at least one blocked running wheel. In actuality, this implement has two running wheels which, however, in the lateral view of the drawing are located exactly congruently behind each other.

The implement for ground treatment in accordance with this embodiment comprises a housing 1 in which a rotor drum 2 is rotatably seated. The rotor drum 2 has freely rotatable beater disks which, in the operating state, beat on the ground B to be treated. A connecting piece 3 is disposed on the housing 1 and ends in a handle, not shown here. In this exemplary embodiment, connecting piece 3 is not pivotable and is rigidly fixed on the housing. The connecting piece 3 is used for pushing the implement for ground treatment, wherein the person operating the implement determines the rate of advancement manually.

The implement for ground treatment has two support rollers and two running wheels 5. The two support rollers are arranged on the housing and are located on the side opposite the connecting piece 3. They cannot be seen in the drawing.

The two running wheels 5 are located on the side of housing 1 facing the connecting piece 3 and are fastened on the housing 1 or at a lower area of the connecting piece 3. These running wheels 5 are height-adjustable. A height adjustment device 4 required for this is disposed on the connecting piece 3. The height adjustment device 4 essentially consists of a pull rod 40, also called height adjustment rod, which extends approximately parallel in respect to the connecting piece 3. On its lower end, the pull rod 40 is connected to a rocker 8, which is held, pivotable around a horizontal pivot shaft 7, on the connecting piece 3. The running wheels 5 are also disposed on the rocker 8, only one of which is visible in the drawings. If the pull rod 40 is moved upward, the running wheels or their wheel shafts 50 are pivoted around the horizontal pivot shaft 7, so that the relative position of the wheel shaft in respect to the ground B is changed and the running wheels 5 are height-adjusted in this way.

The pull rod 40 is securely fastened at its upper end on a pivot fork 41. This pivot fork is a part of a height adjustment lever 42. A position adjustment means 44 is fastened on this height adjustment lever 42. It preferably comprises a serrated plate which is disposed on the height adjustment lever 42 under spring tension. This position adjustment means 44 is in engagement with a toothed disk 31. In this way, it is possible to bring the height adjustment lever 42 into different defined positions and maintain it fixed therein, wherein each position corresponds to a defined height setting of the running wheels 5.

The pull rod 40 is coupled with a restoring spring 43, whose one end is fastened on the lower area of the connecting piece 3 or, as in this exemplary embodiment, by a strap 6 on the housing 1. This restoring spring 43 maintains the pull rod and, thus, the running wheels 5, in a lower end position if the height adjustment lever 42 is not held in another defined, above described position. In this case, the running wheels 5 are in their lowermost position in which they raise the housing 1 high enough so that the rotor drum 2 is raised off the ground B to be treated. In this position, which is illustrated in the drawing, the machine therefore rests on the ground B only on its lowered running wheels 5 and on the support rollers.

In an upper end position, the restoring spring 43 is stretched, the rocker 8 is pivoted around the horizontal pivot shaft 7 by the pull rod 40, so that the running wheels 5 are slightly raised, the housing 1 is lowered and the rotor drum 2 rests on the ground B to be treated.

The implement for ground treatment in accordance with one embodiment of this invention comprises at least one means for blocking at least one of the running wheels 5. In a preferred embodiment, the blocking means 10 are comprised of a stop disposed on the housing 1 or formed by the housing 1 itself. In this exemplary embodiment, the stop is a bolt disposed on the housing 1 in the area of the running wheel 5 visible in the drawings. In its lower end position, the running wheel rests against this blocking means 10. The running wheel 5 is pressed against the blocking means 10 by the force of the restoring spring 43, so that the running wheel 5 is blocked by it. The second, not visible running wheel can be blocked in the same way by an additional stop.

The implement for ground treatment is secured in the non-operating state with the rotor drum raised by the blockage of at least one of the running wheels. If the drive motor of the rotor drum is started, the rotor drum rotates freely without already cutting material. Since at least one running wheel is blocked, the machine cannot make any uncontrolled movements. The safety is only released when the running wheels 5 are slightly raised by the height adjustment device 4. The previously blocked running wheel 5 is pivoted away from the blocking means 10 and can now rotate freely and roll along on the ground B.

In this way, the implement for ground treatment is secured in a simple manner in the non-operational state as well as when the drive motor is started or switched off. It can no longer move uncontrollably, since at least one running wheel is blocked. In addition, the blockage can be performed in the simplest way in that it is only necessary to lower the running wheels so that they rest against a stop located in the area of the housing. Thus, instead of moving the blocking means against the running wheel, the height adjustability of the wheel is used for blocking it. In addition, the blockage, i.e. the lowering of the wheels, can be performed while the person operating the implement is standing, since the height adjustment lever of the pull rod is disposed in the upper area of the connecting piece. The implement for ground treatment is therefore automatically secured as soon as it has been brought into its non-operating position.

What is claimed is:

1. In a manually displaceable implement for ground treatment, comprising a housing (1), a motor-driven rotor drum (2) rotatably seated in the housing (1), a connecting piece (3) and a plurality of height-adjustable running wheels (5), the rotor dram (2) displaced off the ground (B) to be treated in a lower end position of the running wheels (5), the improvement comprising: blocking means for blocking (10) at least one of the running wheels (5), in said lower end position of said running wheels (5), said blocking means comprising a stop, said at least one of said running wheels (5) resting against said stop in said lower end position of said running wheels (5), said at least one of said running wheels (5) being brought into contact with said stop by lowering said at least one of said running wheels into said lower end position.

2. In an implement for ground treatment in accordance with claim 1, wherein the running wheels (5) are pivotably fastened on one of the connecting piece (3) and the housing (1).

3. In an implement for ground treatment in accordance with claim 1, wherein the stop is one of secured to the housing (1) and integrally formed by the housing (1).

4. In an implement for ground treatment in accordance with claim 1, further comprising a spring whereby the at least one running wheel (5) is maintained in said lower end position.

5. In an implement for ground treatment in accordance with claim 4, wherein the connecting piece (3) is fixedly connected to the housing (1).

6. In an implement for ground treatment in accordance with claim 5, wherein means for height adjustment (4) are disposed on the connecting piece (3).

7. In an implement for ground treatment in accordance with claim 1, wherein the connecting piece (3) is fixedly connected to the housing (1).

8. In an implement for ground treatment in accordance with claim 7, wherein means for height adjustment (4) are disposed on the connecting piece (3).

* * * * *